United States Patent Office 3,262,926
Patented July 26, 1966

3,262,926
LINCOMYCIN LOWER-ALKYL ORTHO LOWER-ALKANOATES
Barney J. Magerlein, Portage, Mich., assignor to The Upjohn Company, Kalamazoo, Mich., a corporation of Delaware
No Drawing. Filed Apr. 13, 1964, Ser. No. 359,419
5 Claims. (Cl. 260—210)

This invention relates to novel derivatives of the antibiotic lincomycin and to processes for the preparation thereof, and is particularly directed to cyclic derivatives formed by lincomycin with tri(lower-alkyl) esters of ortho lower alkanoic acids.

Lincomycin is an antibiotic obtained as an elaboration product of a lincomycin-producing actinomycete. Methods for the production, recovery, and purification of lincomycin are described in U.S. Patent 3,086,912.

It has now been found that novel compounds according to this invention are obtained by reacting lincomycin with a tri(lower-alkyl) ester of an ortho lower-alkanoic acid containing 1–4 carbon atoms, inclusive, to produce a lincomycin lower-alkyl ortho lower-alkanoate. Subsequent to this invention, the structure of lincomycin has been elucidated. The novel compounds of the invention, therefore, can now be represented by the following formula:

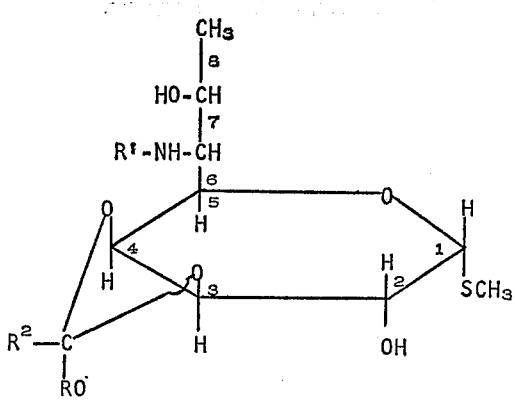

wherein R is lower alkyl; wherein R′ is trans-4-propyl-L-hygroyl; and wherein $R^2$ is selected from the class consisting of hydrogen and lower alkyl.

By lower alkyl is meant alkyl of from 1 to 4 carbon atoms, inclusive, e.g. methyl, ethyl, propyl, butyl, and isomeric forms thereof.

Lincomycin lower-alkyl ortho esters can be made by reacting lincomycin with lower-alkyl esters of ortho lower alkanoic acids in the presence of a strong mineral or organic acid. For example, upon reacting lincomycin with ethyl orthoformate in the presence of perchloric acid there is obtained lincomycin ethyl orthoformate. Other acids such as sulfuric, hydrochloric, phosphoric, and p-toluenesulfonic acid can be used. Perchloric acid is preferred. Other lower alkyl orthoformates such as methyl, propyl, and butyl orthoformate can be employed in the above reaction to make the corresponding lincomycin methyl orthoformate, lincomycin propyl orthoformate, and lincomycin butyl orthoformate. Further, the trialkyl orthoformate can be substituted by a trialkyl orthopropionate or a trialkyl orthobutyrate in the above reactions. The above reaction can be carried out at a temperature from 0 to 50° C., with room temperature preferred.

The novel lincomycin lower-alkyl ortho lower-alkanoates of Formula I exist either in the non-protonated (free base) form or the protonated form depending upon the pH of the environment. They form stable protonates (acid addition salts) on neutralization with suitable acids, for example, hydrochloric, hydrobromic, sulfuric, phosphoric, nitric, perchloric, thiocyanic, fluosilicic, acetic, benzoic salicylic, glycolic, succinic, nicotinic, tartaric, maleic, malic, lactic, methanesulfonic, and cyclohexanesulfamic acids, and the like. These acid addition salts are useful in upgrading the free bases.

The novel lincomycin lower-alkyl ortho lower-alkanoates can be used as antibacterial agents. For example, lincomycin ethyl orthoformate inhibits the growth of *Staphylococcus aureus*, and, therefore, is useful as a disinfectant on washed and stacked food utensils contaminated with this organism. It also can be used to swab the throats of household pets contaminated with this organism.

The following examples are illustrative of the process and products of the present invention but are not to be construed as limiting.

PREPARATION OF LINCOMYCIN

Lincomycin can be prepared in accordance with the procedure set out in U.S. Patent 3,086,912.

*Example 1.—Lincomycin ethyl orthoformate*

One ml. of perchloric acid was added to a solution of 3.94 gm. of lincomyclin in 100 ml. of ethyl orthoformate. The reaction mixture was gently swirled for 2–3 minutes during which time the initial precipitate dissolved. The reaction mixture was diluted with methylene chloride, washed with potassium bicarbonate solution and dried over sodium sulfate. This solution was percolated through 200 gm. of Florisil (a synthetic silicate of the type described in U.S. Patent 2,393,625 and sold by the Floridin Company) and then eluted with solvent prepared by gradiently mixing 4 liters of Skellysolve B (isomeric hexanes) plus 10% ethyl acetate with a mixture of 320 ml. of ethyl acetate and 800 ml. of methanol diluted to 4 liters with Skellysolve B. Crystal-line lincomycin ethyl orthoformate (424 mg.) was obtained in addition to a number of oily fractions. Two recrystallizations from acetone afforded lincomycin ethyl orthoformate having a melting point, 174–177° C., and the following elemental analysis:

Calcd. for $C_{21}H_{38}N_2O_7S$: C, 54.57; H, 8.28; N, 6.06; S, 6.93. Found: C, 54.17; H, 8.47; N, 5.68; S, 7.13.

*S. aureus* infected mice were protected subcutaneously with a $CD_{50}$ of 128 (75–181) mg./kg. of lincomycin ethyl orthoformate.

*Example 2*

Upon substituting the ethyl orthoformate in Example 1 by methyl orthoformate, propyl orthoformate, and butyl orthoformate, there are obtained lincomycin methyl orthoformate, lincomycin propyl orthoformate, and lincomycin butyl orthoformate, respectively.

Example 3

Upon substituting the trialkyl orthoformates in Examples 1 and 2 by methyl orthopropionate, methyl orthobutyrate, ethyl orthopropionate, ethyl orthobutyrate, propyl orthopropionate, propyl orthobutyrate, butyl orthopropionate, and butyl orthobutyrate there are obtained respectively lincomycin methyl orthopropionate, methyl orthobutyrate, ethyl orthopropionate, ethyl orthobutyrate, propyl orthopropionate, propyl orthobutyrate, butyl orthopropionate, and butyl orthobutyrate.

I claim:

1. A compound selected from the class consisting of a compound of the formula:

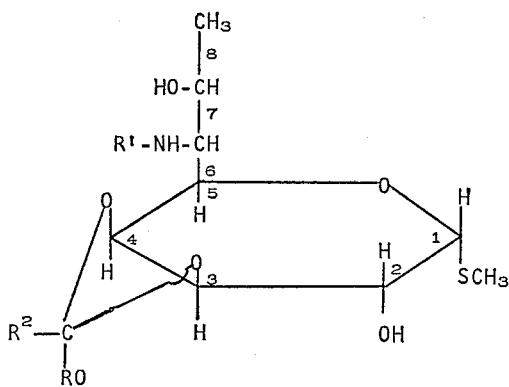

wherein R is lower alkyl; wherein R' is trans-4-propyl-L-hygroyl; and wherein $R^2$ is selected from the class consisting of hydrogen and lower alkyl.

2. Lincomycin ethyl orthoformate ester, a compound of the formula:

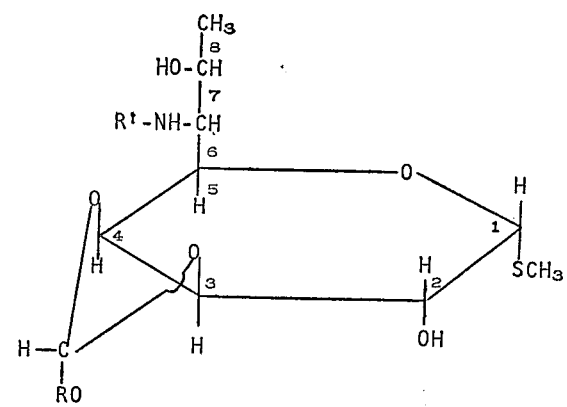

wherein R is ethyl; and wherein R' is trans-4-propyl-L-hygroyl.

3. The acid addition salts of the compound of claim 1.

4. A process for the production of cylic orthoesters of lincomycin which comprises reacting lincomycin with a tri-(lower-alkyl) ortho lower-alkanoate in the presence of a strong acid.

5. A process for the production of lincomycin ethyl orthoformate which comprises reacting lincomycin with ethyl orthoformate in the presence of perchloric acid and isolating the lincomycin ethyl orthoformate so produced.

References Cited by the Examiner

Pigman et al., "Chemistry of the Carbohydrates," 1948, Academic Press Inc., New York, N.Y., pp. 156–159.

Stanek et al., "The Monosaccharides," 1963, Academic Press, New York, N.Y., pp. 291–297.

LEWIS GOTTS, *Primary Examiner.*

JOHNNIE R. BROWN, *Assistant Examiner.*